United States Patent
Furuta et al.

(10) Patent No.: US 8,143,190 B2
(45) Date of Patent: Mar. 27, 2012

(54) HONEYCOMB STRUCTURE

(75) Inventors: Yasuyuki Furuta, Kounan (JP); Takuya Hiramatsu, Nagoya (JP); Fumiharu Sato, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 421 days.

(21) Appl. No.: 12/557,039

(22) Filed: Sep. 10, 2009

(65) Prior Publication Data

US 2010/0093528 A1 Apr. 15, 2010

(30) Foreign Application Priority Data

Oct. 14, 2008 (JP) .................. 2008-264806
Jan. 6, 2009 (JP) .................. 2009-000983

(51) Int. Cl.
*B01J 32/00* (2006.01)
*B32B 3/12* (2006.01)

(52) U.S. Cl. ........ 502/439; 428/116; 428/117; 502/339; 502/325; 502/527.15; 502/527.12; 55/523; 55/524

(58) Field of Classification Search .................. None
See application file for complete search history.

(56) References Cited

U.S. PATENT DOCUMENTS

| | | | |
|---|---|---|---|
| 2005/0191461 A1* | 9/2005 | Kasai et al. | 428/116 |
| 2006/0228520 A1* | 10/2006 | Masukawa et al. | 428/116 |
| 2007/0196248 A1* | 8/2007 | Mizutani | 422/180 |
| 2007/0259153 A1* | 11/2007 | Noguchi et al. | 428/116 |

FOREIGN PATENT DOCUMENTS

| | | |
|---|---|---|
| EP | 1 982 767 A1 | 10/2008 |
| EP | 2 103 337 A2 | 9/2009 |
| EP | 2 108 448 A2 | 10/2009 |
| JP | A-2000-279729 | 10/2000 |
| WO | WO 2008/078799 A1 | 7/2008 |

* cited by examiner

*Primary Examiner* — Melvin Mayes
*Assistant Examiner* — Smita Patel
(74) *Attorney, Agent, or Firm* — Oliff & Berridge, PLC

(57) ABSTRACT

There is disclosed a honeycomb structure having a plurality of segments and each including a plurality of cells, wherein each segment has a porous base material having the honeycomb shape, and a modified portion formed by impregnating a part of the base material with a slurry including particles smaller than the average pore diameter of the base material, followed by a heat treatment, the base material has a porosity of 30 to 80% and an average pore diameter of 5 to 40 μm, and the modified portion is partially formed on the section of the segment vertical (orthogonal) to the axial direction of the cells, and has a porosity which is 2 to 20% lower than that of the base material and an average pore diameter which is 0.1 to 10 μm smaller than that of the base material.

17 Claims, 7 Drawing Sheets

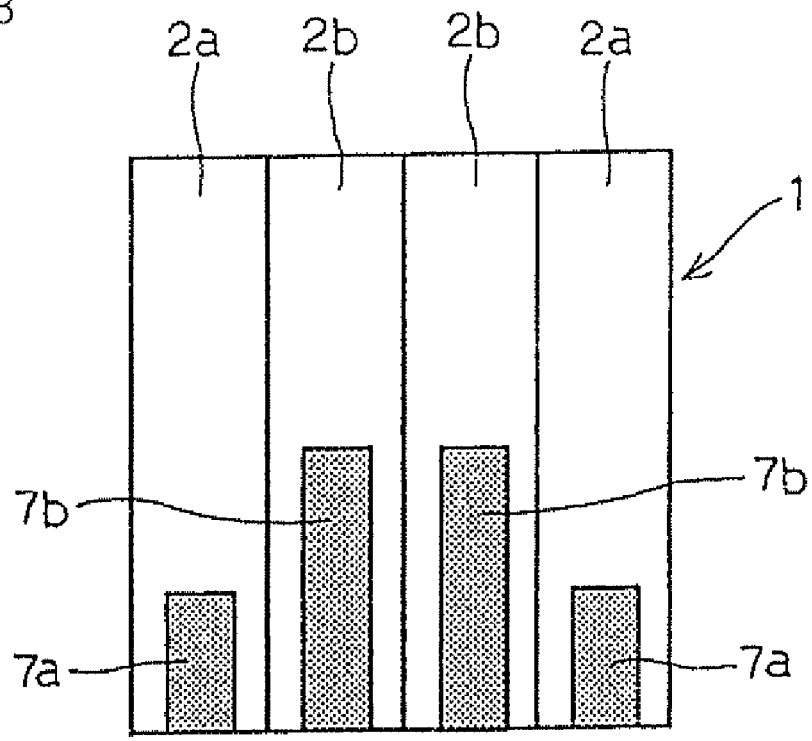
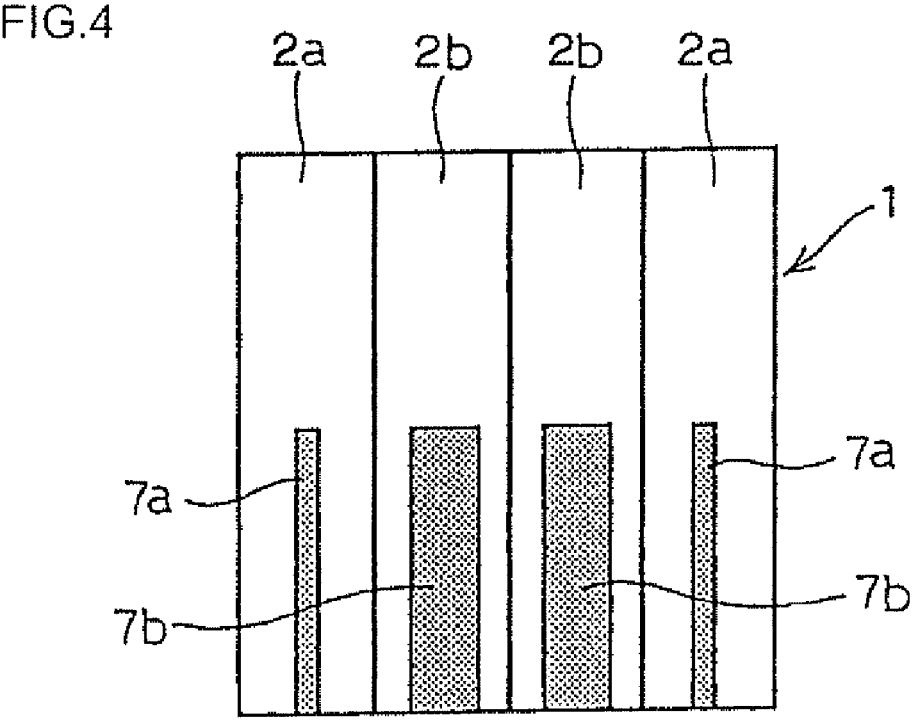

HONEYCOMB STRUCTURE

BACKGROUND OF THE INVENTION

1. Field of the Invention

The present invention relates to a honeycomb structure which is suitably used as a dust collecting filter such as a diesel particulate filter.

2. Description of the Related Art

A honeycomb structure has broadly been used as a collecting filter for an exhaust gas such as a diesel particulate filter (DPF) for collecting and removing a particle material (a particulate matter (PM)) such as soot included in an exhaust gas from a diesel engine or the like.

To use such a honeycomb structure (the filter) continuously for a long time, the filter needs to be periodically subjected to a regeneration treatment. That is, the PM deposited in the filter needs to be burnt and removed in order to decrease a pressure loss increased by the PM deposited in the filter with an elapse of time and to return the performance of the filter to an initial state. During the regeneration of this filter, the PM deposited in the filter burns in order from the inlet side of a fluid (an exhaust gas), and hence a temperature intensely rises in a portion closer to the outlet side of the fluid owing to heat generated before the outlet side and heat of the burning of the PM on the spot. In consequence, there are problems that the temperature rise in the filter easily becomes non-uniform and that a defect such as crack is generated by a heat stress.

To solve the problems, a method is suggested in which the honeycomb structure is constituted of a plurality of segments having a honeycomb shape, and the segments are integrally joined via a joining material made of an elastic material, whereby the heat stress acting on the honeycomb structure is scattered and alleviated (e.g., see JP-A-2000-279729). In consequence, a resistance to thermal shock can be improved to a certain degree. However, in recent years, with the increase of the heat stress accompanying the enlargement of the filter, a sufficient effect cannot easily be obtained only by this method.

To solve the problems, an attempt is made to suppress the temperature rise during the regeneration of the filter by impregnating portions of the segments constituting the honeycomb structure near the end surface of the honeycomb structure on the outlet side thereof with a slurry including particles smaller than the average pore diameter of the segments and performing a heat treatment to densify the portions and increase a heat capacity and a thermal conductivity (e.g., see WO2008-78799).

However, in a conventional technology, when the portions of the segments near the end surface of the honeycomb structure on the outlet side thereof are densified as described above, the whole sections of the segments vertical to the axial direction of cells are subjected to a densifying treatment, and hence a pressure loss becomes excessively high, which causes a practical problem on occasion.

SUMMARY OF THE INVENTION

The present invention has been developed in view of such a conventional situation, and an object thereof is to provide a honeycomb structure having an excellent balance as a filter so as to appropriately suppress a temperature rise near the outlet side of the structure during the regeneration of the filter and prevent a pressure loss from excessively increasing in a case where the structure is used in a DPF.

To achieve the above object, according to the present invention, a honeycomb structure is provided as follows.

[1] A honeycomb structure comprising: a plurality of segments having a honeycomb shape and each including a plurality of cells as through channels of a fluid which are defined by porous partition walls between the inlet-side end surface of the structure as the inlet side of the fluid and the outlet-side end surface of the structure as the outlet side of the fluid, the plurality of segments being assembled and integrally joined in a direction vertical to the axial direction of the cells, wherein each segment comprises a porous base material having the honeycomb shape, and a modified portion formed by impregnating a part of the base material with a slurry including particles smaller than the average pore diameter of the base material, followed by a heat treatment, the base material has a porosity of 30 to 80% and an average pore diameter of 5 to 40 µm, and the modified portion is partially formed on the section of the segment vertical (orthogonal) to axial direction of the cells, and has a porosity which is 2 to 20% lower than that of the base material and an average pore diameter which is 0.1 to 10 µm smaller than that of the base material (a first honeycomb structure).

[2] The honeycomb structure according to [1], wherein at least a part of the segments has a square post-like outer shape, and in the segments having the square post-like outer shape, each of the modified portions is formed into a square post-like shape having a length of one side of the bottom surface thereof which is 20 to 80% of the length of one side of the bottom surface of each segment.

[3] The honeycomb structure according to [1], wherein at least a part of the segments has a square post-like outer shape, and in the segments having the square post-like outer shape, each of the modified portions is formed into a columnar shape having a length of the diameter of the bottom surface thereof which is 20 to 80% of the length of one side of the bottom surface of each segment.

[4] The honeycomb structure according to any one of [1] to [3], wherein each of the modified portions is formed in a range of a length of 1/10 to 1/2 of the whole length of each segment along the axial direction of the cells from the outlet-side end surface of the segment.

[5] The honeycomb structure according to any one of [1] to [4], wherein all the segments have an equal length of the modified portion in the axial direction of the cells, the same modified portion forming region in the sections thereof vertical to the axial direction of the cells, an equal porosity and an equal average pore diameter.

[6] The honeycomb structure according to any one of [1] to [4], wherein in the segments, outer peripheral segments positioned in the outer peripheral portion of the honeycomb structure and central segments positioned on the inner side of the outer peripheral segments have different values of at least one of the length of the modified portion in the axial direction of the cells, the modified portion forming region in the sections thereof vertical to the axial direction of the cells, the porosity and the average pore diameter.

[7] A honeycomb structure comprising: a plurality of segments having a honeycomb shape and each including a plurality of cells as through channels of a fluid which are defined by porous partition walls between the inlet-side end surface of the structure as the inlet side of the fluid and the outlet-side end surface of the structure as the outlet side of the fluid, the plurality of segments being assembled and integrally joined in a direction vertical to the axial direction of the cells, wherein in the segments, outer peripheral segments positioned in the outer peripheral portion of the honeycomb structure are made only of a porous base material having a honeycomb shape, at least a part of central segments positioned on the inner side of the outer peripheral segments comprises the base material, and modified portions formed by impregnating a part of the base material with a slurry including particles smaller than the average pore diameter of the base material, followed by a heat treatment, the remaining central segments are made only of the base material in the same manner as in the outer peripheral segments, the base material has a porosity of 30 to 80% and an average pore diameter of 5 to 40 μm, and the modified portions are partially formed on the section of each of the central segments in the direction vertical to the axial direction of the cells, and have a porosity which is 2 to 20% lower than that of the base material and an average pore diameter which is 0.1 to 10 μm smaller than that of the base material (a second honeycomb structure)

[8] The honeycomb structure according to [7], wherein at least a part of the central segments having the modified portions has a square post-like outer shape, and in the central segments having the square post-like outer shape, each of the modified portions is formed into a square post-like shape having a length of one side of the bottom surface thereof which is 20 to 80% of the length of one side of the bottom surface of each central segment.

[9] The honeycomb structure according to [7], wherein at least a part of the central segments having the modified portions has a square post-like outer shape, and in the central segments having the square post-like outer shape, each of the modified portions is formed into a columnar shape having a length of the diameter of the bottom surface thereof which is 20 to 80% of the length of one side of the bottom surface of each central segment.

[10] The honeycomb structure according to any one of [7] to [9], wherein each of the modified portions is formed in a range of a length of 1/10 to 1/2 of the whole length of each central segment along the axial direction of the cells from the outlet-side end surface of the central segment.

[11] The honeycomb structure according to any one of [7] to [10], wherein all the central segments having the modified portions have an equal length of the modified portion in the axial direction of the cells, the same modified portion forming region in the sections thereof vertical to the axial direction of the cells, an equal porosity and an equal average pore diameter.

[12] The honeycomb structure according to any one of [1] to [11], further comprising: plugging portions which plug openings of predetermined cells in the inlet-side end surface of the structure and which plug openings of the remaining cells in the outlet-side end surface thereof.

[13] The honeycomb structure according to [12], whose open area ratio of the inlet-side end surface thereof is larger than that of the outlet-side end surface thereof.

[14] The honeycomb structure according to any one of [1] to [13], wherein a catalyst component is loaded in the partition walls.

In the honeycomb structure of the present invention, the modified portions (the densified portions) are partially formed on the sections of the segments constituting the honeycomb structure vertical in the axial direction of the cells, whereby when the structure is used in a DPF, a temperature rise near the outlet side of the structure during the regeneration of the filter is appropriately suppressed, and the excessive increase of a pressure loss is also suppressed. The structure has an excellent balance as the filter.

BRIEF DESCRIPTION OF THE DRAWINGS

FIG. 3 is a schematic sectional view schematically showing still another example of the embodiment of the first honeycomb structure according to the present invention;

FIG. 4 is a schematic sectional view schematically showing a further example of the embodiment of the first honeycomb structure according to the present invention;

DESCRIPTION OF REFERENCE NUMERALS

1: honeycomb structure, 2: honeycomb segment, 2a: outer peripheral segment, 2b: central segment, 2b': central segment, 2b'': central segment, 3: partition wall, 5: cell, 5a: square cell, 5b: octagonal cell, 7: modified portion, 7a: modified portion, 7b: modified portion, 7b'': modified portion, 9: plugging portion, 10: inlet-side end surface, and 11: outlet-side end surface.

DESCRIPTION OF THE PREFERRED EMBODIMENT

Hereinafter, the present invention will be described with respect to specific embodiments. The present invention is not limited to the embodiments when interpreted, and can variously be altered, modified or improved based on the knowledge of a person with ordinary skill without departing from the scope of the present invention.

Figure 7:
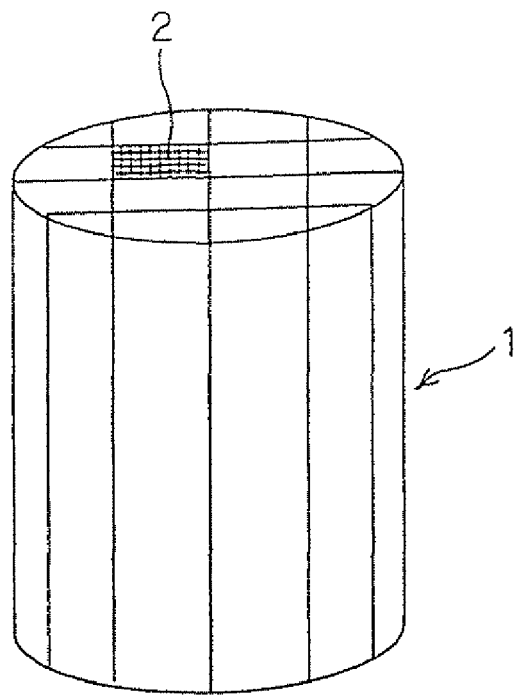
FIG. 7 is a schematic perspective view showing one example of a basic structure of the first and second honeycomb structures according to the present invention.

First and second honeycomb structures of the present invention have a constitution in which a plurality of segments having a honeycomb shape (honeycomb segments) are assembled and integrally joined. FIG. 7 is a schematic perspective view showing one example of a basic structure of the first and second honeycomb structures according to the present invention, and FIG. 8 is a schematic perspective view showing one example of the honeycomb segments constituting the first and second honeycomb structures according to the present invention.

Figure 8:
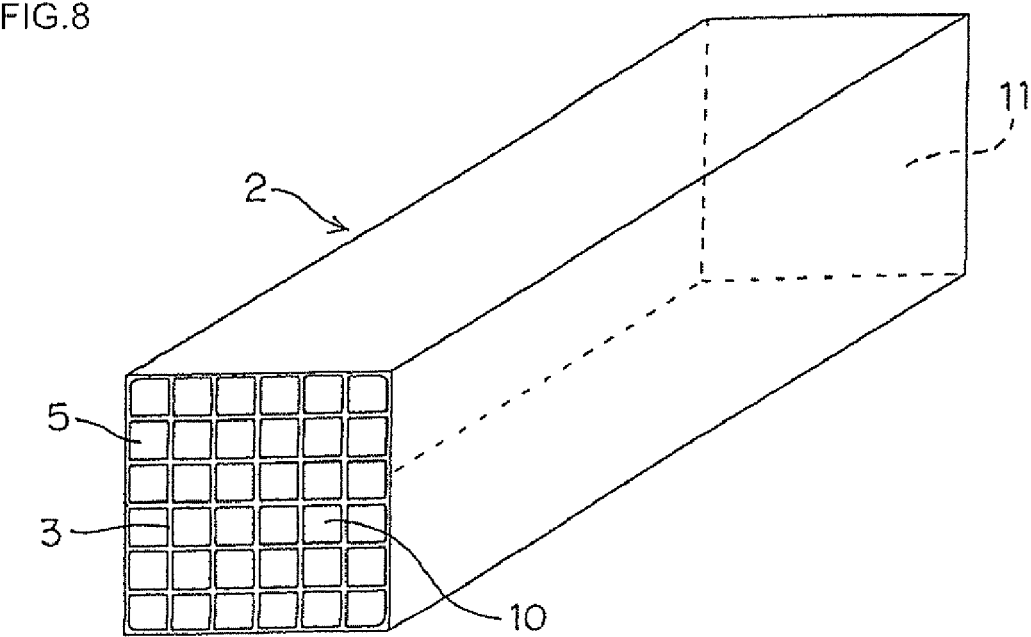
FIG. 8 is a schematic perspective view showing one example of a basic structure of honeycomb segments constituting the first and second honeycomb structures according to the present invention.
Figure 9:
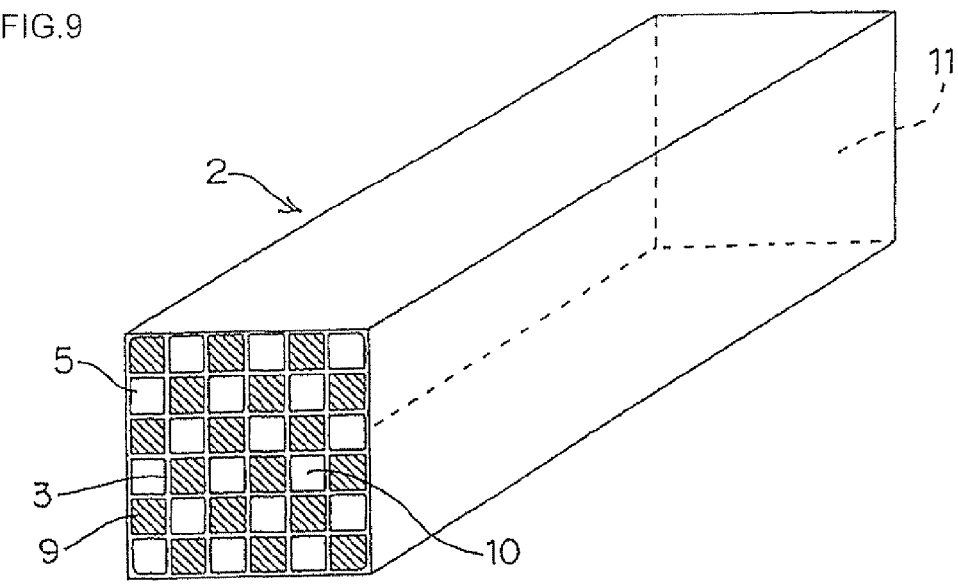
FIG. 9 is a schematic perspective view showing another example of the basic structure of the honeycomb segments constituting the first and second honeycomb structures according to the present invention.

As shown in FIG. 8, a honeycomb segment 2 has an inlet-side end surface 10 on the inlet side of a fluid and an outlet-side end surface 11 on the outlet side of the fluid, and a plurality of cells (through pores) 5 which become through channels of the fluid are defined by porous partition walls 3 between the two end surfaces of the segment. It is to be noted that when the honeycomb structure is used as a filter such as a DPF, the honeycomb structure is usually provided with plugging portions for plugging openings of predetermined cells in the inlet-side end surface of the structure and plugging openings of the remaining cells in the outlet-side end surface thereof. As shown in FIG. 9, the segment is usually plugged so that one end surface of the segment has a checkered-flag pattern formed by plugging portions 9 and so that the other end surface of the segment has a complementary checkered-flag pattern formed by the plugging portions 9. That is, the plugging portions are formed so as to plug the openings of the adjacent cells in the opposite end surfaces of the segment.

In a case where a fluid including a PM such as soot is passed from the one end surface (the inlet-side end surface) of the honeycomb structure constituted of the honeycomb segments provided with the plugging portions in this manner, the fluid flows into the honeycomb structure through the cells having unplugged openings in the one end surface of the structure, passes through the porous partition walls having a filter ability and enters the other through pores having unplugged openings in the other end surface (the outlet-side end surface) of the structure. Then, when the fluid passes through the partition walls, the PM in the fluid is collected by the partition walls, and the fluid purified by removing the PM therefrom is discharged from the other end surface of the structure.

As shown in FIG. 7, first and second honeycomb structures 1 of the present invention have a constitution in which a plurality of honeycomb segments 2 are assembled and integrally joined in a direction vertical to the axial direction of the cells. A joining material is used for joining the honeycomb segments 2, and preferable examples of this joining material include a material made of main components such as a ceramic fiber having a thermal resistance, a filler of ceramic particles and an inorganic adhesive such as colloidal silica. Furthermore, if necessary, an organic binder (e.g., methyl cellulose (MC), carboxymethyl cellulose (CMC) or the like), a dispersant, water and the like are added to the material, and this material is mixed and kneaded by using a kneader such as a mixer to form a pasted material.

The joining face of each honeycomb segment is coated with such a joining material in a predetermined thickness, and the honeycomb segments are assembled. Afterward, the joining material is dried and hardened, and the honeycomb structure is formed in which the plurality of honeycomb segments are integrated. Subsequently, if necessary, the outer peripheral portion of the honeycomb structure is ground, whereby the honeycomb structure may be processed into a desired shape such as a columnar shape. It is to be noted that in this case, the structure is processed so as to remove an outer peripheral wall of the structure, and inner partition walls and cells are exposed. Therefore, the exposed surface of the structure is preferably covered with a coating material or the like so as to reform the outer peripheral wall of the structure.

All the honeycomb segments used in the first honeycomb structure of the present invention have a porous base material having a honeycomb shape, and modified portions (densified portions) formed by impregnating a part of the base material with a slurry including particles smaller than the average pore diameter of this base material, followed by a heat treatment. Moreover, in the honeycomb segments used in the second honeycomb structure of the present invention, outer peripheral segments positioned in the outer peripheral portion of the honeycomb structure and central segments positioned on the inner side of the outer peripheral segments are different from each other in the presence of the modified portions among the segments. That is, all the outer peripheral segments are made only of the base material, but at least a part of the central segments has the base material and the modified portions formed by impregnating a part of the base material with the slurry including particles smaller than the average pore diameter of this base material, followed by the heat treatment, and the remaining central segments are made only of the base material in the same manner as in the outer peripheral segments.

The modified portions are formed for a purpose of increasing a heat capacity and a thermal conductivity near the outlet-side end surface of the honeycomb structure where a temperature easily excessively rises during the filter regeneration, to appropriately suppress the temperature rise and improve a resistance to thermal shock, in a case where the honeycomb structure of the present invention is used in the DPF. However, in the first and second honeycomb structures of the present invention, the modified portions are partially formed on the sections of the segments vertical to the axial direction of the cells so that a pressure loss does not excessively increase by the formation of the modified portions.

As described above, the temperature easily excessively rises near the outlet-side end surface of the honeycomb structure during the regeneration of the filter. The ease of the temperature rise was checked for a segment unit of the honeycomb structure, and it has been confirmed that the center of the section of the segment vertical to the axial direction of the cells has the highest temperature. Therefore, even in a case where the whole sections of the segments vertical to the axial direction of the cells are not provided with the modified portions (densified), when the modified portions are partially formed in a region of the segment section where the temperature easily becomes high, it is sufficiently possible to appropriately suppress the temperature rise during the regeneration of the filter. Moreover, when the formation of the modified portions on the sections of the segments is limited to a partial region, the excessive increase of the pressure loss due to the formation of the modified portions can be suppressed. Furthermore, in the second honeycomb structure of the present invention, the honeycomb segments provided with the modified portions are further limited to at least a part of the central segments, whereby the increase of the pressure loss due to the formation of the modified portions is easily suppressed.

In the present invention, a modified portion forming region of each honeycomb segment in the axial direction of the cells is preferably a range of a length of $1/10$ to $1/2$ of the whole length of the honeycomb segment along the axial direction of the cells from the outlet-side end surface of the honeycomb segment. When the modified portion forming region is below $1/10$ of the whole length of the honeycomb segment, it becomes difficult on occasion to secure such a heat capacity and thermal conductivity as to effectively suppress the excessive temperature rise near the outlet-side end surface of the structure during the regeneration of the filter. When the region exceeds $1/2$ of the whole length of the honeycomb segment, the pressure loss excessively increases by the modified portions, and a practical problem is generated in the filter on occasion.

Figure 10:
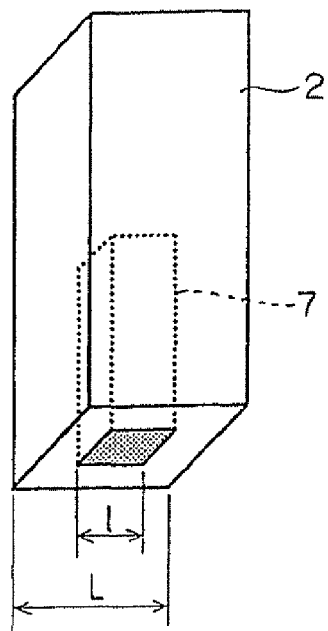
FIG. 10 is a schematic perspective view showing one example of the segment provided with a modified portion obliquely from the downside of the outlet-side end surface of the structure.

FIG. 10 is a schematic perspective view showing one example of the segment provided with the modified portion obliquely from the downside of the outlet-side end surface of the structure. This segment 2 has a square post-like outer shape, and a modified portion 7 is also formed into a square post-like shape. The modified portion 7 is preferably formed into a square post-like shape having a length l of one side of the bottom surface thereof which is 20 to 80% of a length L of one side of the bottom surface of each segment 2, and the segment having such an outer shape and the modified portion 7 is preferably used in at least a part of the segments constituting the honeycomb structure of the present invention. When the length l of the one side of the bottom surface of the modified portion 7 is below 20% of the length L of the one side of the bottom surface of the segment 2, it becomes difficult on occasion to secure such a heat capacity and thermal conductivity as to effectively suppress the excessive temperature rise near the outlet-side end surface of the structure during the regeneration of the filter. When the length exceeds 80%, the pressure loss excessively increases by the modified portion 7, and the practical problem is generated in the filter on occasion. It is to be noted that a more preferable range of the length l of the one side of the bottom surface of the modified portion 7 is a length of 25 to 65% of the length L of the one side of the bottom surface of the segment 2.

Figure 11:
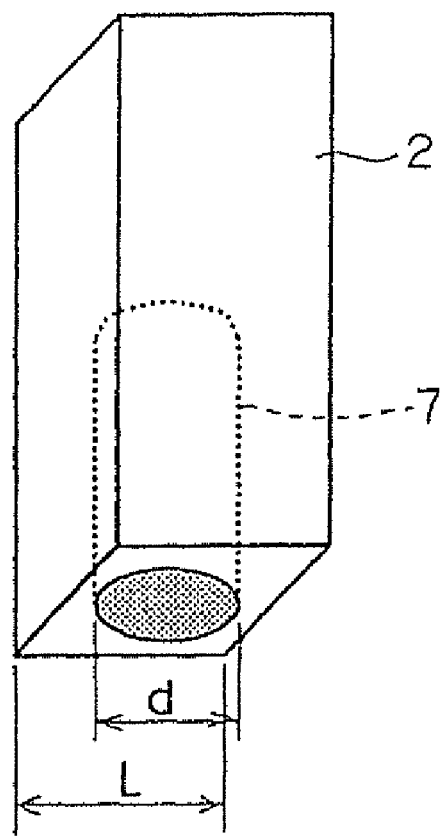
FIG. 11 is a schematic perspective view showing another example of the segment provided with the modified portion obliquely from the downside of the outlet-side end surface of the structure.

FIG. 11 is a schematic perspective view showing another example of the segment provided with the modified portion obliquely from the downside of the outlet-side end surface of the structure. This segment 2 has a square post-like outer shape, and a modified portion 7 is formed into a columnar shape. The modified portion 7 is preferably formed into a columnar shape having a length d of the diameter of the bottom surface thereof which is 20 to 80% of a length L of one side of the bottom surface of each segment 2, and the segment having such an outer shape and the modified portion 7 is preferably used in at least a part of the segments constituting the honeycomb structure of the present invention. When the length d of the diameter of the bottom surface of the modified portion 7 is below 20% of the length L of the one side of the bottom surface of the segment, it becomes difficult on occasion to secure such a heat capacity and thermal conductivity as to effectively suppress the excessive temperature rise near the outlet-side end surface of the structure during the regeneration of the filter. When the length exceeds 80%, the pressure loss excessively increases by the modified portion 7, and the practical problem is generated in the filter on occasion. It is to be noted that a more preferable range of the length d of the diameter of the bottom surface of the modified portion 7 is a length of 25 to 55% of the length L of the one side of the bottom surface of the segment.

The base material in the first and second honeycomb structures of the present invention has a porosity of 30 to 80%, preferably 45 to 80%. When the porosity of the base material is below 30%, the pressure loss of the base material is excessively large. When the porosity exceeds 80%, the maximum temperature during the filter regeneration excessively rises, and the practical problem occurs. The base material has an average pore diameter of 5 to 40 µm, preferably 5 to 20 µm. When the average pore diameter of the base material is below 5 µm, the pressure loss of the base material itself is excessively large. When the average pore diameter exceeds 40 µm, the PM collecting function of the filter excessively lowers, and hence the practical problem occurs.

The porosity of the modified portion is 2 to 20% lower than that of the base material (a value obtained by subtracting 2 to 20% from the porosity of the base material), preferably 3 to 12% lower than that of the base material. When the decrease of the porosity of the modified portion with respect to the porosity of the base material is below 2%, it is not possible to sufficiently obtain an effect produced by the formation of the modified portion, that is, an effect of suppressing the excessive temperature rise near the outlet-side end surface of the structure during the regeneration of the filter. When the decrease exceeds 20%, the pressure loss excessively increases. Moreover, the average pore diameter of the modified portion is 0.1 to 10 µm, preferably 0.1 to 5 µm smaller than that of the base material. When the decrease of the average pore diameter of the modified portion with respect to the average pore diameter of the base material is below 0.1 µm, it is not possible to sufficiently obtain the effect produced by the formation of the modified portion. When the decrease exceeds 10 µm, the pressure loss excessively increases.

It is to be noted that "the porosity" defined in the present invention is measured by Archimedes process using, as a test piece, a flat plate cut from the portion of the base material which is not provided with any modified portion or the portion provided with the modified portion and having a partition wall thickness, and "the average pore diameter" is measured by mercury porosimeter using a test piece cut from the portion of the base material which is not provided with any modified portion or the portion provided with the modified portion and having a predetermined shape (□5×15 mm).

In the first honeycomb structure of the present invention, all the honeycomb segments constituting the honeycomb structure may have an equal length of the modified portion in the axial direction of the cells, the same modified portion forming region in the sections thereof vertical to the axial direction of the cells, an equal porosity and an equal average pore diameter. In the above limited range, outer peripheral segments positioned in the outer peripheral portion of the honeycomb structure and central segments positioned on the inner side of the outer peripheral segments among the segments constituting the honeycomb structure may have different values of at least one of the length of the modified portion in the axial direction of the cells, the modified portion forming region in the sections thereof vertical to the axial direction of the cells, the porosity and the average pore diameter.

Moreover, in the second honeycomb structure of the present invention, all the central segments having the modified portions may have an equal length of the modified portion in the axial direction of the cells, the same modified portion forming region in the sections thereof vertical to the axial direction of the cells, an equal porosity and an equal average pore diameter. In the above limited range, the plurality of central segments having the modified portions may have different values of at least one of the length of the modified portion in the axial direction of the cells, the modified portion forming region in the sections thereof vertical to the axial direction of the cells, the porosity and the average pore diameter.

Figure 1:
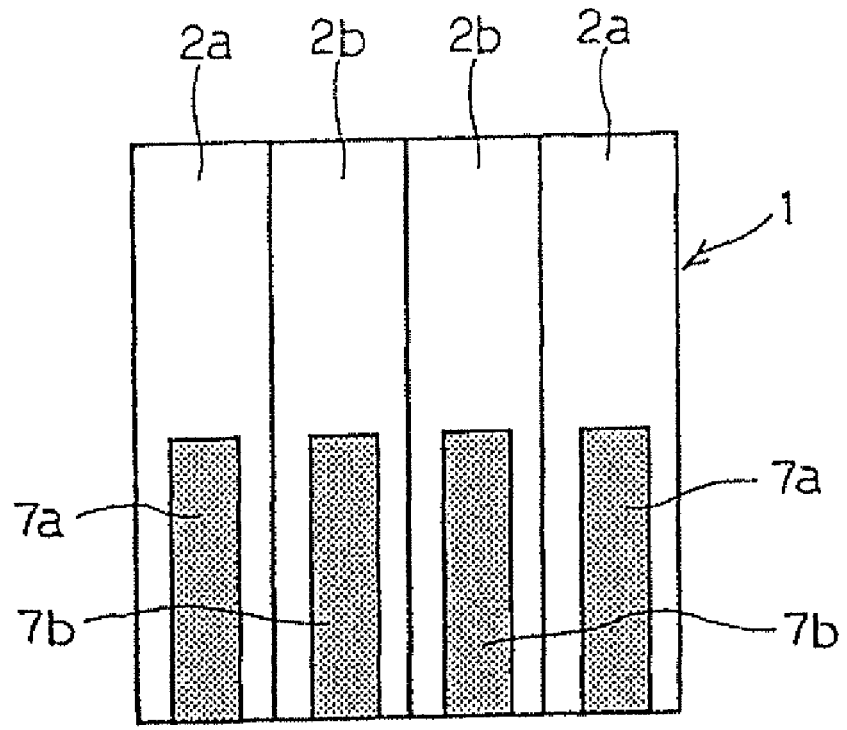
FIG. 1 is a schematic sectional view schematically showing one example of an embodiment of a first honeycomb structure according to the present invention.

FIG. 1 is a schematic sectional view schematically showing one example of the embodiment of the first honeycomb structure according to the present invention. In this embodiment, modified portions 7a of outer peripheral segments 2a positioned in the outer peripheral portion of a honeycomb structure 1 and modified portions 7b of central segments 2b positioned on the inner side of the outer peripheral segments 2a have an equal length in the axial direction of the cells and the same forming region on the sections of the segments vertical to the axial direction of the cells, and these modified portions 7a, 7b have an equal porosity and an equal average pore diameter. In such an embodiment, the effect of the present invention can usually sufficiently be exerted.

Figure 2:
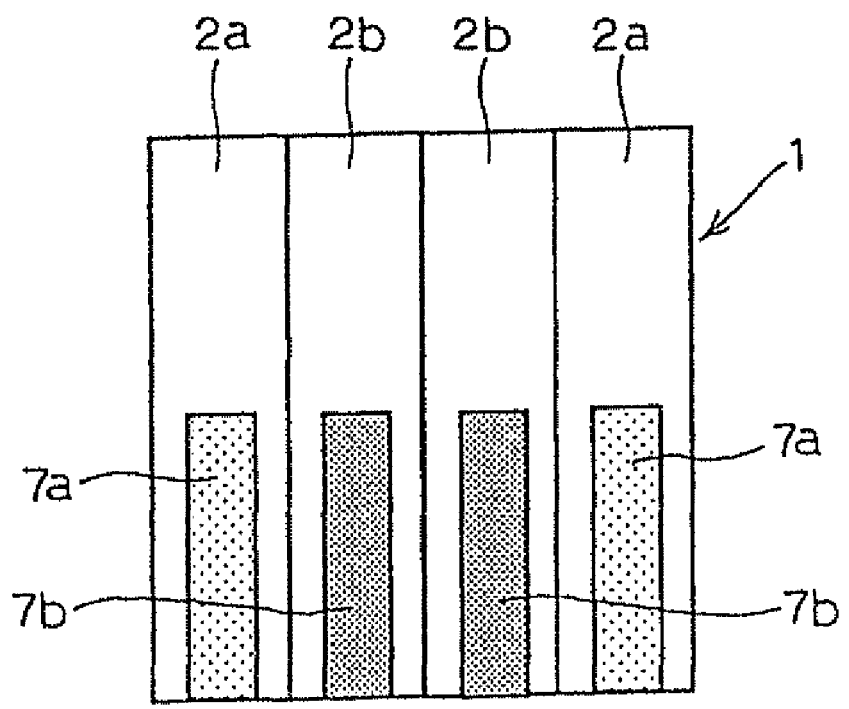
FIG. 2 is a schematic sectional view schematically showing another example of the embodiment of the first honeycomb structure according to the present invention.

FIG. 2 is a schematic sectional view schematically showing another example of the embodiment of the first honeycomb structure according to the present invention. In this embodiment, modified portions 7a of outer peripheral segments 2a positioned in the outer peripheral portion of a honeycomb structure 1 and modified portions 7b of central segments 2b positioned on the inner side of the outer peripheral segments 2a have an equal length in the axial direction of the cells and the same forming region on the sections of the segments vertical to the axial direction of the cells, but the modified portions 7b of the central segments 2b have lower (smaller) porosity and average pore diameter as compared with the modified portions 7a of the outer peripheral segments 2a. During the regeneration of the filter, a temperature easily rises near the outlet-side end surface of the structure. Furthermore, even near this outlet-side end surface, especially in the center of the section of the structure in a diametric direction thereof, heat is not easily released externally from the structure, and the temperature tends to easily rise as compared with the outer peripheral portion of the structure. In consequence, the modified portions 7b of the central segments 2b are preferably further densified in this manner to increase the heat capacity and thermal conductivity and alleviate the generation of a heat stress due to the non-uniformity of a temperature distribution.

FIG. 3 is a schematic sectional view schematically showing still another example of the embodiment of the first honeycomb structure according to the present invention. In this embodiment, modified portions 7a of outer peripheral segments 2a positioned in the outer peripheral portion of a honeycomb structure 1 and modified portions 7b of central segments 2b positioned on the inner side of the outer peripheral segments 2a have the same forming region on the sections of the segments vertical to the axial direction of the cells and an equal porosity and average pore diameter, but the modified portions 7b of the central segments 2b have a larger length in the axial direction of the cells as compared with the modified portions 7a of the outer peripheral segments 2a. As described above, even near the outlet-side end surface of the structure, especially in the center of the section of the structure in a diametric direction thereof, heat is not easily released externally from the structure, and the temperature tends to easily rise as compared with the outer peripheral portion of the structure. In consequence, the modified portions 7b of the central segments 2b are preferably further lengthened in this manner to increase heat capacity and thermal conductivity and alleviate the generation of a heat stress due to the non-uniformity of a temperature distribution.

FIG. 4 is a schematic sectional view schematically showing a further example of the embodiment of the first honeycomb structure according to the present invention. In this embodiment, modified portions 7a of outer peripheral segments 2a positioned in the outer peripheral portion of a honeycomb structure 1 and modified portions 7b of central segments 2b positioned on the inner side of the outer peripheral segments 2a have an equal length in the axial directions of cells, an equal porosity and an equal average pore diameter, but the modified portions 7b of the central segments 2b have larger forming regions on the sections of the segments vertical to the axial direction of the cells as compared with the modified portions 7a of the outer peripheral segments 2a. As described above, even near the outlet-side end surface of the structure, especially in the center of the section of the structure in a diametric direction thereof, heat is not easily released externally from the structure, and the temperature tends to easily rise as compared with the outer peripheral portion of the structure. In consequence, the forming regions of the modified portions 7b of the central segments 2b are preferably further broadened in this manner to increase heat capacity and thermal conductivity and alleviate the generation of a heat stress due to the non-uniformity of a temperature distribution.

Figure 5:
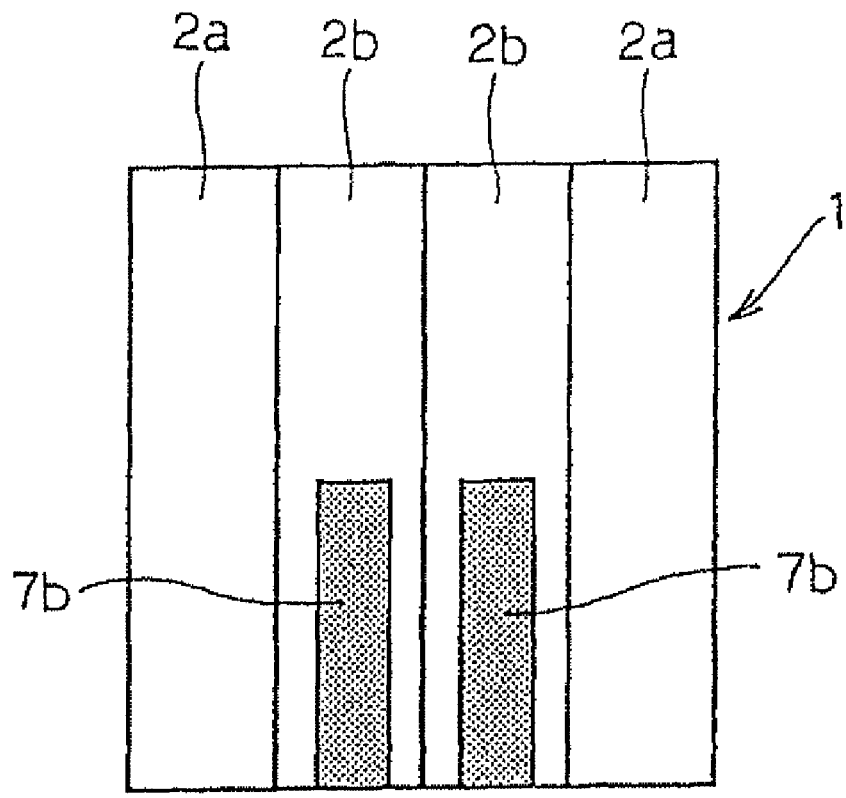
FIG. 5 is a schematic sectional view schematically showing one example of an embodiment of a second honeycomb structure according to the present invention.

FIG. 5 is a schematic sectional view schematically showing one example of the embodiment of the second honeycomb structure according to the present invention. In this embodiment, outer peripheral segments 2a positioned in the outer peripheral portion of a honeycomb structure 1 are not provided with any modified portion, and only central segments 2b positioned on the inner side of the outer peripheral segments 2a are provided with modified portions 7b. As described above, even near the outlet-side end surface of the structure, especially in the center of the section of the structure in a diametric direction thereof, heat is not easily released externally from the structure, and the temperature tends to easily rise as compared with the outer peripheral portion of the structure. In consequence, the only central segments 2b are preferably provided with the modified portions 7b in this manner to increase heat capacity and thermal conductivity and alleviate the generation of a heat stress due to the non-uniformity of a temperature distribution.

Figure 6:
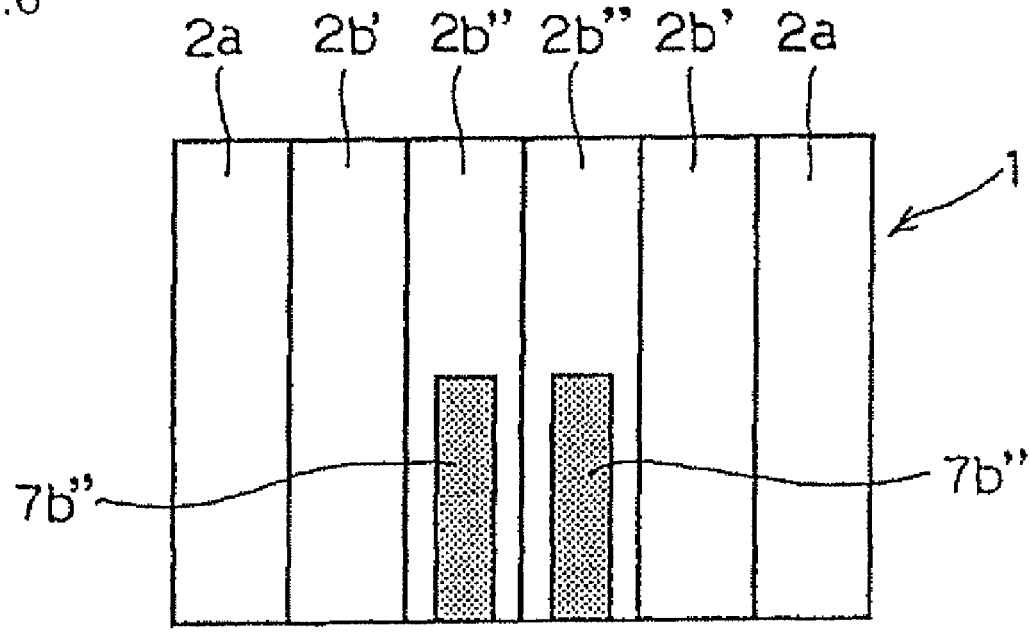
FIG. 6 is a schematic sectional view schematically showing another example of the embodiment of the second honeycomb structure according to the present invention.

FIG. 6 is a schematic sectional view schematically showing another example of the embodiment of the second honeycomb structure according to the present invention. In this embodiment, in outer peripheral segments 2a positioned in the outer peripheral portion of a honeycomb structure 1, and central segments 2b' positioned adjacent to the outer peripheral segments 2a among central segments positioned on the inner side of the outer peripheral segments 2a, any modified portion is not formed. Only central segments 2b" positioned on the inner side of the central segments 2b' are provided with modified portions 7b". In the central segments, heat is not easily released externally from the structure, and the temperature tends to easily rise as compared with the outer peripheral segments. Therefore, it is preferable to form the modified portions, but when the number of the segments constituting the honeycomb structure is large, as to the central segments positioned close to the outer periphery of the honeycomb structure among the central segments, the heat is comparatively easily released in the same manner as in the outer peripheral segments. In consequence, even when such central segments and the outer peripheral segments are not provided with any modified portion and the only other central segments are provided with the modified portions to increase heat capacity and thermal conductivity, the generation of a heat stress due to the non-uniformity of a temperature distribution can be alleviated.

It is to be noted that in the first and second honeycomb structures of the present invention, there is not any special restriction on the number of the outer peripheral segments as long as the number is necessary for forming the outer peripheral portion of the honeycomb structure, and there is not any special restriction on the number of the central segments as long as the central segments are positioned on the inner side of the outer peripheral segments.

From the viewpoints of strength, thermal resistance and the like, preferable examples of the constituent material of the base material of the honeycomb segments in the first and second honeycomb structures of the present invention include at least one material selected from the group consisting of silicon carbide (SiC), a silicon-silicon carbide based composite material formed by using silicon carbide (SiC) as an aggregate and silicon (Si) as a combining material, silicon nitride, cordierite, mullite, alumina, spinel, a silicon carbide-cordierite based composite material, lithium aluminum silicate, aluminum titanate and an Fe—Cr—Al based metal. As the constituent material of the plugging portions, the same material as that of the honeycomb structure or the honeycomb segments is preferably used so as to decrease a thermal expansion difference between the plugging portions and the honeycomb structure or the honeycomb segments.

As a manufacturing method of the base material, a heretofore known method may be used. As one example of a specific method, a binder such as methyl cellulose, hydroxypropoxyl cellulose, hydroxyethyl cellulose, carboxymethyl cellulose or polyvinyl alcohol, a pore former, a surfactant, water as a solvent and the like are added to the above material to form a clay having plasticity, and this clay is extruded into a predetermined honeycomb shape, followed by drying with microwaves, hot air or the like and firing. When the cells are provided with the plugging portions, the firing may be performed before forming the plugging portions in the cells, or may be performed together with the firing of the plugging portions after forming the plugging portions in the cells.

As a plugging method of the cells, a heretofore known method may be used. As one example of a specific method, a sheet is attached to the end surface of each honeycomb segment, and holes are made in positions of the sheet corresponding to the cells to be plugged. While this sheet is attached, the end surface of the honeycomb segment is immersed into a plugging slurry made of the slurried constituent material of the plugging portions, and the plugging slurry is charged into the opening ends of the cells to be plugged through the holes made in the sheet, followed by drying and/or firing to harden the slurry.

The porosity or average pore diameter of the base material can be adjusted in accordance with the particle diameters of the material, the particle diameters of the pore former, the amount of the pore former to be added, firing conditions and the like.

In the honeycomb structure used in the DPF, all the cells have the same shape (usually a square) and an equal open area, and the cells are alternately plugged so as to form the checkered-flag patterns in the inlet-side end surface and outlet-side end surface of the structure. Moreover, the inlet-side end surface of the structure usually has an open area ratio equal to that of the outlet-side end surface thereof. However, in recent years, a honeycomb structure has been suggested in which for a purpose of suppressing the increase of the pressure loss after the collection of the soot or the like, the open area ratio of the inlet-side end surface of the structure is larger than that of the outlet-side end surface thereof. Such a structure may be applied even to the honeycomb structure of the present invention.

Figure 12:
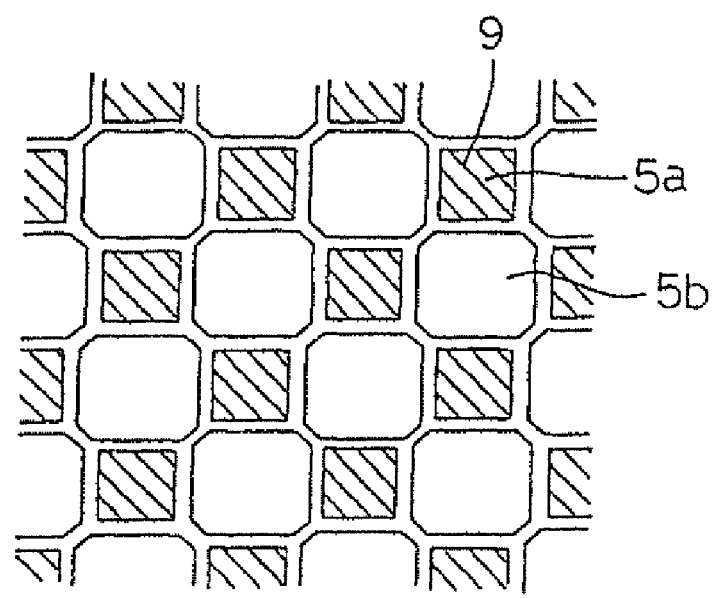
FIG. 12 is a partially enlarged view of the inlet-side end surface of the honeycomb structure showing one example of an embodiment of the structure having different open area ratios in the inlet-side end surface and outlet-side end surface thereof.
Figure 13:
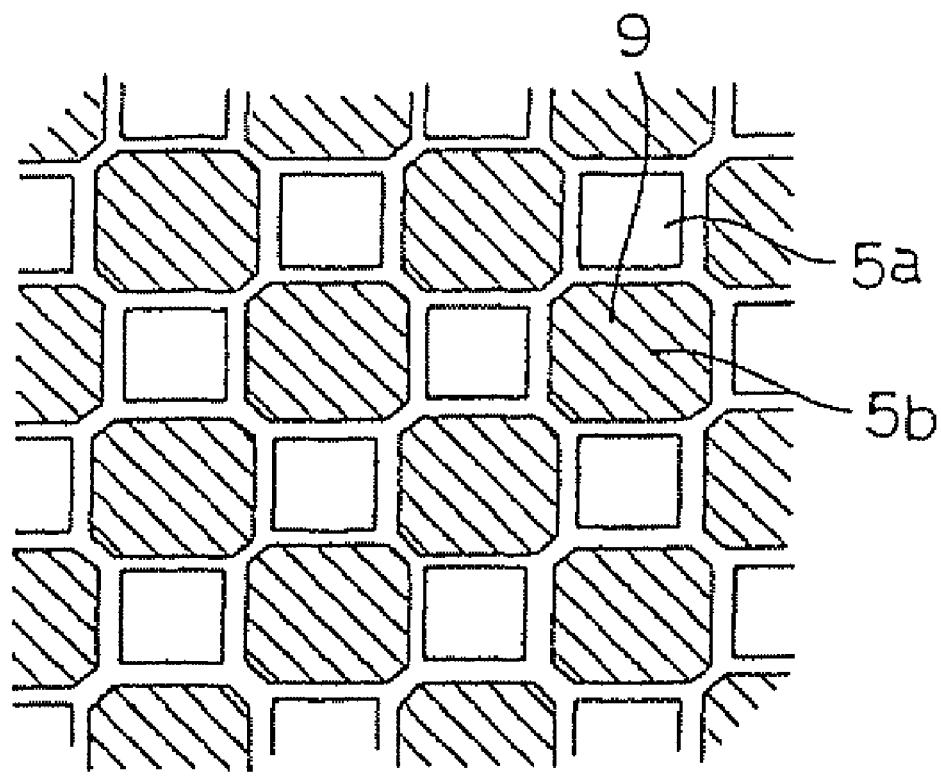
FIG. 13 is a partially enlarged view of the outlet-side end surface of the honeycomb structure showing the example of the embodiment of the structure having different open area ratios in the inlet-side end surface and outlet-side end surface thereof.

FIGS. 12 and 13 show one example of an embodiment of a plugged honeycomb structure having an open area ratio in the inlet-side end surface thereof which is different from that in the outlet-side end surface thereof. FIG. 12 is a partially enlarged view of the inlet-side end surface of the structure, and FIG. 13 is a partially enlarged view of the outlet-side end surface thereof. As shown in these drawings, in this embodiment, square cells 5*a* and octagonal cells 5*b* having open areas larger than those of the square cells are alternately arranged in two directions crossing each other at right angles on the respective end surfaces of the structure. The square cells 5*a* are plugged with plugging portions 9 in the inlet-side end surface of the structure, and the octagonal cells 5*b* with the plugging portions 9 in the outlet-side end surface thereof. Thus, the octagonal cells 5*b* having large open areas are opened in the inlet-side end surface of the structure, and the square cells 5*a* having small open areas are opened in the outlet-side end surface thereof, whereby the open area ratio of the inlet-side end surface of the structure can be larger than that of the outlet-side end surface thereof.

The modified portions can be formed by, for example, a method of preparing a modified slurry including particles smaller than the average pore diameter of the base material; immersing the one end surface of the base material into this slurry so as to immerse a portion of the material having a predetermined length to be provided with the modified portion; and impregnating the portion with the slurry, that is, charging particles included in the slurry into the pores of the partition walls of the base material, followed by a heat treatment. It is to be noted that before the immersing, a sheet provided with openings corresponding to the shape/dimension of each of the modified portions to be formed on the section of the base material vertical to the axial direction of the cells is attached to one end surface of the base material so that portions other than the portions to be provided with the modified portions are not impregnated with any slurry. It is to be noted that the modified portions may be formed before the segments are joined, or may be formed in the honeycomb structure after the segments are joined. When the modified portions are formed before joining the segments, the regions provided with the modified portions, and the porosities and average pore diameters of the modified portions can freely be set for each segment. However, even in a case where the modified portions are formed in the honeycomb structure, when masking and a plurality of modified processes are performed, the regions provided with the modified portions, and the porosities and average pore diameters of the modified portions can be set for each segment. Therefore, the forming of the modified portions is not limited by the state of the honeycomb structure.

The modified slurry includes a component which finally remains in the partition walls and which chemically or physically changes as long as the component is not removed. The modified slurry preferably includes, as densifying particles, a ceramic material selected from the group consisting of silicon carbide, silicon nitride, cordierite, alumina, mullite, zirconia, zirconium phosphate, aluminum titanate, titania and a combination of them, an Fe—Cr—Al based metal, a nickel-based metal, inorganic powder of metal Si and SiC and the like. Furthermore, particles included in a wash-coat material for loading a catalyst component in the honeycomb structure may be used. For example, γ-alumina, ceria, zirconia, ceria-based composite oxide, zirconia based composite oxide or the like may be used.

Moreover, the particle diameters of the particles preferably have a size of 2 to 60% of the average pore diameter of the base material. When the average pore diameter of the particles is below 2% of that of the base material, the particles to be charged into the pores of the partition walls are excessively small as compared with pore diameters, and eventually the particles might not be sufficiently charged into the pores. That is, the particles unfavorably are not held in the pores and pass through the pores sometimes. On the other hand, when the average pore diameter of the particles exceeds 60% of that of the base material, the particles to be charged into the pores of the partition walls are excessively large as compared with the pore diameters, and hence the particles unfavorably might not be charged into the pores (might not enter the pores).

In addition to such particles, the modified slurry includes a combining material capable of combining the particles with the inner surfaces of the pores, and these materials are preferably diluted with water. Furthermore, a dispersant, a defoaming agent or the like may appropriately be included.

As the combining material, colloidal sol such as silica sol or alumina sol, a layered compound swelling and indicating combining properties or the like is preferably usable. The conditions of the heat treatment after the impregnation with the modified slurry may appropriately be determined by the composition of the modified slurry. When the modified with the modified slurry having the same composition as that of the base material is performed, the heat treatment on the same conditions as the firing conditions of the base material is required for imparting the combining properties. In a case where a material such as colloidal silica which develops strength at 700 to 800° C. is combined, the heat treatment at a low temperature can be performed.

The decrease of the porosity of the modified portion with respect to the porosity of the base material or the decrease of the average pore diameter of the modified portion with respect to the average pore diameter of the base material can be adjusted in accordance with the particle diameters of the particles included in the modified slurry, the content of the particles, the number of the times of the impregnation with the modified slurry and the like.

In the first and second honeycomb structures of the present invention, the thicknesses of the partition walls of the honeycomb segments are preferably 7 to 20 mil (178 to 508 μm), more preferably 8 to 16 mil (203 to 406 μm), further preferably 10 to 12 mil (254 to 305 μm). When the thicknesses of the partition walls are below 7 mil, the strength runs short, and the resistance to thermal shock lowers on occasion. On the other hand, when the thicknesses of the partition walls exceed 20 mil, the pressure loss tends to increase.

A cell density is preferably 140 to 350 cells/in$^2$ (cpsi), more preferably 160 to 320 cpsi, and further preferably 200 to 300 cpsi. When the cell density is below 140 cpsi, the contact efficiency with the fluid tends to run short. On the other hand, when the cell density exceeds 350 cpsi, the pressure loss tends to increase. It is to be noted that "cpsi" is the abbreviation of "cells per square inch", and is a unit indicating the number of the cells per square inch. For example, 10 cpsi is about 1.55 cells/cm$^2$.

There is not any special restriction on a cell shape (the shape of each cell section). Examples of the shape include a polygonal shape such as a square, triangular, hexagonal or octagonal shape, and a circular shape, or cells having different shapes as described above may be combined and arranged.

Furthermore, in the first and second honeycomb structures of the present invention, the catalyst component is preferably loaded in the partition walls for a purpose of promoting the burning of the PM during the regeneration of the filter or removing harmful substances from an exhaust gas to purify the gas. Examples of a method for loading the catalyst component in the partition walls include a method in which powder made of a thermally resistant inorganic oxide having a large specific surface area, for example, alumina powder is impregnated with a solution including a catalyst component, dried and then fired to obtain the powder containing the catalyst component. Alumina sol, water and the like is added to this powder to prepare the catalyst slurry, and each honeycomb segment or the honeycomb structure is immersed into and coated with this slurry, followed by drying and firing.

As the catalyst component, it is preferable to use one or more noble metals selected from the group consisting of Pt, Rh and Pd. The amount of the noble metals to be loaded is preferably 0.3 to 3.5 g/L per unit volume of the honeycomb structure.

EXAMPLES

Hereinafter, the present invention will be described with respect to the examples in more detail, but the present invention is not limited to these examples.

Examples 1 to 18 and Comparative Examples 1 to 6

SiC powder and metal Si powder were mixed at a mass ratio of 80:20, and a pore former, an organic binder, a surfactant and water were added to the mixture to obtain a clay having plasticity. This clay was extruded and dried to obtain a formed honeycomb-like article. This formed honeycomb-like article was provided with plugging portions in one end of each of cells so that both end surfaces of the article had a checkered-flag pattern. That is, the plugging portions were formed so that the adjacent cells were plugged in opposite end surfaces of the article. As a material of the plugging portions, the same material as that of the formed honeycomb-like article was used. Thus, the plugging portions were formed, followed by drying. Afterward, the formed honeycomb-like article was degreased in the atmosphere at about 400° C., and further fired in an Ar atmosphere at about 1450° C., and SIC particles in the formed article were combined by Si. In consequence, there was obtained a base material of a square post-like honeycomb segment having porosity and average pore diameter as shown in Table 1, a partition wall thickness of 12 mil (305 μm), square cells, a cell density of about 46.5 cells/cm$^2$ (300 cells/square inch), a square section with one side of 35 mm and a length of 152 mm in an axial direction of the segment. It is to be noted that the measurement method of the porosity and average pore diameter has been described above.

Next, 150 parts by mass of colloidal silica (a solution having a solid content of 40%) and 200 parts by mass of water were added to 150 parts by mass of SiC particles having particle diameters of 2 μm, and well stirred to prepare a modified slurry. It is to be noted that during the preparation, a dispersant and a defoaming agent were appropriately added. A sheet was provided with square openings so that an area ratio with respect to the area of the section of the base material vertical to the axial direction of the cells had a value shown in the modified portion sectional area ratio of Table 1, and attached to one end surface of the base material. Afterward, a portion of the base material having a predetermined length from the one end surface thereof provided with the sheet was immersed into the modified slurry, and an excessive slurry was removed by air blowing. Next, the slurry was dried, and a heat treatment was performed at 700° C., to form square post-like modified portions having the values of the ratio of the length thereof with respect to the whole length of the base material (the modified portion length ratio), the ratio of the area thereof with respect to the whole area of the section of the base material vertical to the axial direction of the cells (the modified portion sectional area ratio), the decrease of the porosity thereof with respect to the porosity of the base material (the porosity decrease) and the decrease of the average pore diameter thereof with respect to the average pore diameter of the base material (the average pore diameter decrease) as shown in Table 1, respectively, thereby obtaining honeycomb segments. However, in Comparative Examples 1 to 6, any sheet was not attached to the one end surface of the base material, and the modified portions were formed on the whole section of the base material vertical to the axial direction of the cells.

Subsequently, water was further added to a mixture of SiC powder, aluminosilicate fiber, aqueous silica sol solution and clay, and kneaded for 30 minutes by use of a mixer, to obtain a pasted joining material. A step of coating the outer peripheral surface of the honeycomb segment with this joining material in a thickness of about 1 mm to form a joining material layer and disposing another honeycomb segment on the joining material layer was repeated, to prepare a laminated honeycomb segment article including 16 honeycomb segments in total as a combination of 4×4 honeycomb segments. Then, an external pressure was appropriately applied to the article to join the whole article, followed by drying at 120° C. for two hours, thereby obtaining a joined honeycomb segment article. The outer periphery of the joined honeycomb segment article was ground so that the outer shape of the article was columnar, and the processed surface of the article was coated with a coating material having the same composition as that of the joining material, to reform the outer peripheral wall of the article, followed by drying and hardening at 700° C. for two hours. In consequence, honeycomb structures of Examples 1 to 18 and Comparative Examples 1 to 6 were obtained.

As to the honeycomb structures of Examples 1 to 18 and Comparative Examples 1 to 6 prepared in this manner, a pressure loss increase ratio and the increase of the amount of soot at a maximum temperature of 1200° C. during regeneration were obtained by the following method, and the results are shown in Table 1.

[Pressure Loss Increase Ratio]

First, an exhaust gas including the soot at 200° C. was passed through the honeycomb structures (the modified honeycomb structures) of Examples 1 to 18 and Comparative Examples 1 to 6 provided with the modified portions at a flow rate of 2.27 Nm³/min, and the soot was gradually deposited. When the amount of the deposited soot reached 4 g/L, pressure losses before and after the honeycomb structure were measured, and the pressure loss of the modified honeycomb structure after the deposition of the soot was obtained. Moreover, honeycomb structures which were not provided with any modified portion (the unmodified honeycomb structures) were prepared by a procedure similar to the preparation procedure of the honeycomb structure of each of the examples and comparative examples except that any modified portion was not formed in the base material, and the pressure losses of these unmodified honeycomb structures were measured by a similar measurement method, whereby the pressure loss of the unmodified honeycomb structure after the deposition of the soot was obtained. The pressure loss increase ratio was obtained from each pressure loss measured as described above by use of the following equation.

The pressure loss increase ratio (%)=(the pressure loss of the modified honeycomb structure after the deposition of the soot/the pressure loss of the unmodified honeycomb structure after the deposition of the soot−1)×100

[Increase of Soot Amount at Maximum Temperature of 1200° C. During Regeneration]

First, 6, 8 and 10 g/L of the soot were deposited in each honeycomb structure (the modified honeycomb structure) of each of Examples 1 to 18 and Comparative Examples 1 to 6 provided with the modified portions, and the honeycomb structure in which the soot was deposited was installed in an engine bench. Post injection was turned on while keeping an engine rotation number of 2000 rpm and an engine torque of 60 Nm, and the post injection was turned off at a timing when the pressure losses before and after the honeycomb structure began to decrease, whereby the history of the temperature in the honeycomb structure when switching the engine state to an idling state was measured. A relation between the amount of the deposited soot and the maximum temperature in a DPF was calculated from this measurement result, and the amount of the soot at the maximum temperature of 1200° C. during the regeneration was calculated from the relation, whereby the amount of the soot deposited in the modified honeycomb structure was obtained. Moreover, honeycomb structures which were not provided with any modified portion and the like (the unmodified honeycomb structures, etc.) were prepared by a procedure similar to the preparation procedure of the honeycomb structure of each of the examples and comparative examples except that any modified portion was not formed in the base material, and the amount of the soot at the maximum temperature of 1200° C. during the regeneration in these unmodified honeycomb structures was calculated by a similar measurement method, whereby the amount of the soot deposited in the unmodified honeycomb structure was obtained. The increase of the amount of the soot at the maximum temperature of 1200° C. during the regeneration was obtained from each soot amount calculated as described above by use of the following equation.

The increase (g/L) of the amount of the soot at the maximum temperature of 1200° C. during the regeneration=the amount of the soot deposited in the modified honeycomb structure−the amount of the soot deposited in the unmodified honeycomb structure

TABLE 1

| | Porosity (%) | Average pore diameter (μm) | Porosity decrease (%) | Average pore diameter decrease (μm) | Modified portion length ratio | Modified portion sectional area ratio | Pressure loss increase ratio (%) | Increase of soot amount with which maximum temperature reached 1200° C. during regeneration (g/L) |
|---|---|---|---|---|---|---|---|---|
| Comp. Exam. 1 | 42 | 14 | 7.0 | 2.0 | 0.5 | 1.00 | 16.9 | 1.0 |
| Exam. 1 | 42 | 14 | 7.0 | 2.0 | 0.5 | 0.49 | 8.3 | 1.0 |
| Exam. 2 | 42 | 14 | 7.0 | 2.0 | 0.5 | 0.16 | 2.7 | 0.9 |
| Example 3 | 42 | 14 | 7.0 | 2.0 | 0.5 | 0.01 | 0.2 | 0.1 |
| Comp. Exam. 2 | 42 | 14 | 12.5 | 2.4 | 0.5 | 1.00 | 39.4 | 1.4 |
| Exam. 4 | 42 | 14 | 12.5 | 2.4 | 0.5 | 0.49 | 19.3 | 1.3 |
| Exam. 5 | 42 | 14 | 12.5 | 2.4 | 0.5 | 0.16 | 6.3 | 1.2 |
| Exam. 6 | 42 | 14 | 12.5 | 2.4 | 0.5 | 0.01 | 0.4 | 0.1 |
| Comp. Exam. 3 | 49 | 13 | 7.3 | 2.0 | 0.5 | 1.00 | 15.3 | 1.1 |
| Exam. 7 | 49 | 13 | 7.3 | 2.0 | 0.5 | 0.49 | 7.5 | 1.0 |
| Exam. 8 | 49 | 13 | 7.3 | 2.0 | 0.5 | 0.16 | 2.4 | 0.9 |
| Exam. 9 | 49 | 13 | 7.3 | 2.0 | 0.5 | 0.01 | 0.2 | 0.1 |
| Comp. Exam. 4 | 49 | 13 | 13.0 | 2.1 | 0.5 | 1.00 | 38.7 | 1.4 |
| Exam. 10 | 49 | 13 | 13.0 | 2.1 | 0.5 | 0.49 | 19.0 | 1.3 |
| Exam. 11 | 49 | 13 | 13.0 | 2.1 | 0.5 | 0.16 | 6.2 | 1.2 |

TABLE 1-continued

| | Porosity (%) | Average pore diameter (μm) | Porosity decrease (%) | Average pore diameter decrease (μm) | Modified portion length ratio | Modified portion sectional area ratio | Pressure loss increase ratio (%) | Increase of soot amount with which maximum temperature reached 1200° C. during regeneration (g/L) |
|---|---|---|---|---|---|---|---|---|
| Exam. 12 | 49 | 13 | 13.0 | 2.1 | 0.5 | 0.01 | 0.4 | 0.1 |
| Comp. Exam. 5 | 58 | 14 | 7.5 | 1.6 | 0.5 | 1.00 | 13.6 | 1.1 |
| Exam. 13 | 58 | 14 | 7.5 | 1.6 | 0.5 | 0.49 | 6.7 | 1.0 |
| Exam. 14 | 58 | 14 | 7.5 | 1.6 | 0.5 | 0.16 | 2.2 | 0.9 |
| Exam. 15 | 58 | 14 | 7.5 | 1.6 | 0.5 | 0.01 | 0.1 | 0.1 |
| Comp. Exam. 6 | 58 | 14 | 12.7 | 1.8 | 0.5 | 1.00 | 32.1 | 1.4 |
| Exam. 16 | 58 | 14 | 12.7 | 1.8 | 0.5 | 0.49 | 15.7 | 1.3 |
| Exam. 17 | 58 | 14 | 12.7 | 1.8 | 0.5 | 0.16 | 5.1 | 1.2 |
| Exam. 18 | 58 | 14 | 12.7 | 1.8 | 0.5 | 0.01 | 0.3 | 0.1 |

As shown in Table 1, when the honeycomb structures having the same constitution except the modified portion sectional area ratio are compared with each other, the pressure loss increase ratio of the structure having a modified portion sectional area ratio smaller than 1.00, that is, the honeycomb structure of the example constituted of the honeycomb segments provided with the modified portions partially formed on the sections of the segments vertical to the axial direction of the cells is smaller than the pressure loss increase ratio of the structure having a modified portion sectional area ratio of 1.00, that is, the honeycomb structure of the comparative example constituted of the honeycomb segments provided with the modified portions formed on the whole sections of the segments vertical to the axial direction of the cells. It is seen from this result that even when the honeycomb structure of the example is provided with the modified portions densified to suppress the temperature rise near the outlet side of the fluid during the filter regeneration, the excessive increase of the pressure loss due to the modified portions does not easily occur.

Examples 19 to 36 and Comparative Examples 7 to 12

Honeycomb structures were prepared in the same manner as in Examples 1 to 18 and Comparative Examples 1 to 6 described above, except that each honeycomb structure was constituted of 16 honeycomb segments in total including 12 outer peripheral segments positioned in the outer peripheral portion of the structure and four central segments positioned on the inner side of the outer peripheral segments, the segments had different values of at least one of the modified portion length ratio, the porosity decrease and the average pore diameter decrease of the modified portions as shown in Table 2, and the shape of openings of a sheet attached to one end surface of each base material was formed into a circular shape when immersing the base material into a modified slurry to form each modified portion into a columnar shape. As to these honeycomb structures, a pressure loss increase ratio, and the increase of the amount of soot at a maximum temperature of 1200° C. during regeneration were obtained. The results are shown in Table 2. It is to be noted that in the table, the outer peripheral segment having a value of 0 in "the modified portion length ratio" is not provided with any modified portion. Moreover, the values of "the modified portion sectional area ratio" indicate the values of both the central segment and the outer peripheral segment (with the proviso that when the outer peripheral segment is not provided with any modified portion, the value only of the central segment is indicated).

TABLE 2

| | Base material | | Central segment | | | Outer peripheral segment | | | Modified portion sectional area ratio | Pressure loss increase ratio(%) | Increase of soot amount with which maximum temperature reached 1200° C. during regeneration (g/L) |
|---|---|---|---|---|---|---|---|---|---|---|---|
| | Porosity (%) | Average pore diameter (μm) | Porosity decrease (%) | Average pore diameter decrease (μm) | Modified portion length ratio | Porosity decrease (%) | Average pore diameter decrease (μm) | Modified portion length ratio | | | |
| Comp. Exam. 7 | 42 | 14 | 7.1 | 1.9 | 0.5 | 0.0 | 0.0 | 0 | 1.00 | 14.9 | 1.0 |
| Exam. 19 | 42 | 14 | 7.1 | 1.9 | 0.5 | 0.0 | 0.0 | 0 | 0.79 | 11.7 | 1.0 |
| Exam. 20 | 42 | 14 | 7.1 | 1.9 | 0.5 | 0.0 | 0.0 | 0 | 0.13 | 1.9 | 0.9 |
| Exam. 21 | 42 | 14 | 7.1 | 1.9 | 0.5 | 0.0 | 0.0 | 0 | 0.01 | 0.1 | 0.1 |
| Comp. Exam. 8 | 42 | 14 | 12.3 | 2.3 | 0.5 | 2.8 | 2.3 | 0.5 | 1.00 | 29.3 | 1.3 |
| Exam. 22 | 42 | 14 | 12.3 | 2.3 | 0.5 | 2.8 | 2.3 | 0.5 | 0.79 | 23.0 | 1.3 |
| Exam. 23 | 42 | 14 | 12.3 | 2.3 | 0.5 | 2.8 | 2.3 | 0.5 | 0.13 | 3.7 | 1.2 |
| Exam. 24 | 42 | 14 | 12.3 | 2.3 | 0.5 | 2.8 | 2.3 | 0.5 | 0.01 | 0.2 | 0.1 |
| Comp. Exam. 9 | 51 | 23 | 7.0 | 1.8 | 0.5 | 0.0 | 0.0 | 0 | 1.00 | 15.4 | 1.0 |
| Exam. 25 | 51 | 23 | 7.0 | 1.8 | 0.5 | 0.0 | 0.0 | 0 | 0.79 | 12.1 | 1.0 |
| Exam. 26 | 51 | 23 | 7.0 | 1.8 | 0.5 | 0.0 | 0.0 | 0 | 0.13 | 1.9 | 0.9 |
| Exam. 27 | 51 | 23 | 7.0 | 1.8 | 0.5 | 0.0 | 0.0 | 0 | 0.01 | 0.1 | 0.1 |
| Comp. Exam. 10 | 51 | 23 | 13.0 | 2.4 | 0.5 | 2.8 | 2.2 | 0.5 | 1.00 | 27.8 | 1.4 |
| Exam. 28 | 51 | 23 | 13.0 | 2.4 | 0.5 | 2.8 | 2.2 | 0.5 | 0.79 | 21.9 | 1.4 |

TABLE 2-continued

|  | Base material | | Central segment | | | Outer peripheral segment | | | Modified portion sectional area ratio | Pressure loss increase ratio(%) | Increase of soot amount with which maximum temperature reached 1200° C. during regeneration (g/L) |
|---|---|---|---|---|---|---|---|---|---|---|---|
|  | Porosity (%) | Average pore diameter (μm) | Porosity decrease (%) | Average pore diameter decrease (μm) | Modified portion length ratio | Porosity decrease (%) | Average pore diameter decrease (μm) | Modified portion length ratio | | | |
| Exam. 29 | 51 | 23 | 13.0 | 2.4 | 0.5 | 2.8 | 2.2 | 0.5 | 0.13 | 3.5 | 1.2 |
| Exam. 30 | 51 | 23 | 13.0 | 2.4 | 0.5 | 2.8 | 2.2 | 0.5 | 0.01 | 0.2 | 0.1 |
| Comp. Exam. 11 | 58 | 14 | 7.1 | 2.0 | 0.5 | 0.0 | 0.0 | 0 | 1.00 | 12.0 | 1.0 |
| Exam. 31 | 58 | 14 | 7.1 | 2.0 | 0.5 | 0.0 | 0.0 | 0 | 0.79 | 9.4 | 1.0 |
| Example 32 | 58 | 14 | 7.1 | 2.0 | 0.5 | 0.0 | 0.0 | 0 | 0.13 | 1.5 | 0.9 |
| Example 33 | 58 | 14 | 7.1 | 2.0 | 0.5 | 0.0 | 0.0 | 0 | 0.01 | 0.1 | 0.1 |
| Comp. Exam. 12 | 58 | 14 | 13.1 | 1.9 | 0.5 | 3.4 | 1.7 | 0.5 | 1.00 | 23.7 | 1.4 |
| Exam. 34 | 58 | 14 | 13.1 | 1.9 | 0.5 | 3.4 | 1.7 | 0.5 | 0.79 | 18.6 | 1.4 |
| Exam. 35 | 58 | 14 | 13.1 | 1.9 | 0.5 | 3.4 | 1.7 | 0.5 | 0.13 | 3.0 | 1.2 |
| Exam. 36 | 58 | 14 | 13.1 | 1.9 | 0.5 | 3.4 | 1.7 | 0.5 | 0.01 | 0.2 | 0.1 |

As shown in Table 2, when the honeycomb structures having the same constitution except the modified portion sectional area ratio are compared with each other, the pressure loss increase ratio of the structure having a modified portion sectional area ratio smaller than 1.00, that is, the honeycomb structure of the example constituted of the honeycomb segments provided with the modified portions partially formed on the sections of the segments vertical to the axial direction of the cells is smaller than the pressure loss increase ratio of the structure having a modified portion sectional area ratio of 1.00, that is, the honeycomb structure of the comparative example constituted of the honeycomb segments provided with the modified portions formed on the whole sections of the segments vertical to the axial direction of the cells. It is seen from this result that even when the honeycomb structure of the example is provided with the modified portions densified to suppress the temperature rise near the outlet side of the fluid during the filter regeneration, the excessive increase of the pressure loss due to the modified portions does not easily occur.

The present invention can preferably be used as a dust collecting filter such as a DPF.

What is claimed is:

1. A honeycomb structure comprising: a plurality of segments having a honeycomb shape and each including a plurality of cells as through channels of a fluid which are defined by porous partition walls between the inlet-side end surface of the structure as the inlet side of the fluid and the outlet-side end surface of the structure as the outlet side of the fluid, the plurality of segments being assembled and integrally joined in a direction vertical to the axial direction of the cells, wherein each segment comprises a porous base material having the honeycomb shape, and a modified portion formed by impregnating a part of the base material with a slurry including particles smaller than the average pore diameter of the base material, followed by a heat treatment, the base material has a porosity of 30 to 80% and an average pore diameter of 5 to 40 μm, and the modified portion is partially formed on the section of the segment orthogonal to the axial direction of the cells, and has a porosity which is 2 to 20% lower than that of the base material and an average pore diameter which is 0.1 to 10 μm smaller than that of the base material.

2. The honeycomb structure according to claim 1, wherein at least a part of the segments has a square post-like outer shape, and in the segments having the square post-like outer shape, each of the modified portions is formed into a square post-like shape having a length of one side of the bottom surface thereof which is 20 to 80% of the length of one side of the bottom surface of each segment.

3. The honeycomb structure according to claim 1, wherein at least a part of the segments has a square post-like outer shape, and in the segments having the square post-like outer shape, each of the modified portions is formed into a columnar shape having a length of the diameter of the bottom surface thereof which is 20 to 80% of the length of one side of the bottom surface of each segment.

4. The honeycomb structure according to claim 1, wherein each of the modified portions is formed in a range of a length of 1/10 to 1/2 of the whole length of each segment along the axial direction of the cells from the outlet-side end surface of the segment.

5. The honeycomb structure according to claim 1, wherein all the segments have an equal length of the modified portion in the axial direction of the cells, the same modified portion forming region in the sections thereof vertical to the axial direction of the cells, an equal porosity and an equal average pore diameter.

6. The honeycomb structure according to claim 1, wherein in the segments, outer peripheral segments positioned in the outer peripheral portion of the honeycomb structure and central segments positioned on the inner side of the outer peripheral segments have different values of at least one of the length of the modified portion in the axial direction of the cells, the modified portion forming region in the sections thereof vertical to the axial direction of the cells, the porosity and the average pore diameter.

7. The honeycomb structure according to claim 1, further comprising: plugging portions which plug openings of predetermined cells in the inlet-side end surface of the structure and which plug openings of the remaining cells in the outlet-side end surface thereof.

8. The honeycomb structure according to claim 7, whose open area ratio of the inlet-side end surface thereof is larger than that of the outlet-side end surface thereof.

9. The honeycomb structure according to claim 1, wherein a catalyst component is loaded in the partition walls.

10. A honeycomb structure comprising: a plurality of segments having a honeycomb shape and each including a plurality of cells as through channels of a fluid which are defined by porous partition walls between the inlet-side end surface of the structure as the inlet side of the fluid and the outlet-side end surface of the structure as the outlet side of the fluid, the plurality of segments being assembled and integrally joined in a direction vertical to the axial direction of the cells,
wherein in the segments, outer peripheral segments positioned in the outer peripheral portion of the honeycomb structure are made only of a porous base material having a honeycomb shape,
at least a part of central segments positioned on the inner side of the outer peripheral segments comprises the base material, and modified portions formed by impregnating a part of the base material with a slurry including particles smaller than the average pore diameter of the base material, followed by a heat treatment, the remaining central segments are made only of the base material in the same manner as in the outer peripheral segments,
the base material has a porosity of 30 to 80% and an average pore diameter of 5 to 40 μm, and
the modified portions are partially formed on the section of each of the central segments in the direction orthogonal to the axial direction of the cells, and have a porosity which is 2 to 20% lower than that of the base material and an average pore diameter which is 0.1 to 10 μm smaller than that of the base material.

11. The honeycomb structure according to claim 10, wherein at least a part of the central segments having the modified portions has a square post-like outer shape, and in the central segments having the square post-like outer shape, each of the modified portions is formed into a square post-like shape having a length of one side of the bottom surface thereof which is 20 to 80% of the length of one side of the bottom surface of each central segment.

12. The honeycomb structure according to claim 10, wherein at least a part of the central segments having the modified portions has a square post-like outer shape, and in the central segments having the square post-like outer shape, each of the modified portions is formed into a columnar shape having a length of the diameter of the bottom surface thereof which is 20 to 80% of the length of one side of the bottom surface of each central segment.

13. The honeycomb structure according to claim 10, wherein each of the modified portions is formed in a range of a length of 1/10 to 1/2 of the whole length of each central segment along the axial direction of the cells from the outlet-side end surface of the central segment.

14. The honeycomb structure according to claim 10, wherein all the central segments having the modified portions have an equal length of the modified portion in the axial direction of the cells, the same modified portion forming region in the sections thereof vertical to the axial direction of the cells, an equal porosity and an equal average pore diameter.

15. The honeycomb structure according to claim 10, further comprising: plugging portions which plug openings of predetermined cells in the inlet-side end surface of the structure and which plug openings of the remaining cells in the outlet-side end surface thereof.

16. The honeycomb structure according to claim 15, whose open area ratio of the inlet-side end surface thereof is larger than that of the outlet-side end surface thereof.

17. The honeycomb structure according to claim 10, wherein a catalyst component is loaded in the partition walls.

* * * * *